(12) United States Patent
Shibata

(10) Patent No.: US 8,424,433 B2
(45) Date of Patent: Apr. 23, 2013

(54) SUPPORT LEG DEVICES AND CUTTING TOOLS HAVING THE SUPPORT LEG DEVICES

(75) Inventor: Yoshinori Shibata, Anjo (JP)

(73) Assignee: Makita Corporation, Anjo-shi (JP)

(*) Notice: Subject to any disclaimer, the term of this patent is extended or adjusted under 35 U.S.C. 154(b) by 0 days.

(21) Appl. No.: 13/373,044

(22) Filed: Nov. 3, 2011

(65) Prior Publication Data

US 2012/0055311 A1 Mar. 8, 2012

Related U.S. Application Data

(62) Division of application No. 12/219,516, filed on Jul. 23, 2008, now Pat. No. 8,079,294.

(30) Foreign Application Priority Data

Jul. 26, 2007 (JP) ................................ 2007-194566

(51) Int. Cl.
   *B23D 45/04* (2006.01)
(52) U.S. Cl.
   USPC ........................................... 83/471.3; 83/490
(58) Field of Classification Search ................. 83/471.3, 83/473, 490, 486, 485, 486.1
   See application file for complete search history.

(56) References Cited

U.S. PATENT DOCUMENTS

| 679,468 | A | 7/1901 | Pratt | |
|---|---|---|---|---|
| 1,658,244 | A | 3/1925 | Lewis | |
| 3,006,673 | A | 1/1959 | Swick | |
| 5,242,141 | A | 9/1993 | Chester | |
| 6,779,428 | B2 * | 8/2004 | Kao | 83/469 |
| 7,387,056 | B2 * | 6/2008 | Higuchi | 83/483 |
| 7,395,993 | B2 | 7/2008 | Riedl | |
| 2002/0144582 | A1 | 10/2002 | He | |
| 2003/0037656 | A1 * | 2/2003 | Brunson | 83/581 |

FOREIGN PATENT DOCUMENTS

| JP | A-4-130804 | 5/1992 |
|---|---|---|
| JP | A-5-41701 | 2/1993 |
| JP | A-2003-245901 | 9/2003 |

OTHER PUBLICATIONS

Feb. 11, 2011 Office Action in U.S. Appl. No. 12/219,516.
Jun. 15, 2011 Final Office Action in U.S. Appl. No. 12/219,516.
Sep. 27, 2011 Notice of Allowance in U.S. Appl. No. 12/219,516.

* cited by examiner

*Primary Examiner* — Kenneth E. Peterson
(74) *Attorney, Agent, or Firm* — Oliff & Berridge PLC

(57) ABSTRACT

A cutting tool has a table for placing a workpiece thereon. A cutting unit is mounted to the table. A support leg device includes a support leg, an operation member and a motion conversion mechanism. The motion conversion mechanism is coupled between the support leg and the operation member, so that the movement of the operation member is converted into the movement of the support leg.

4 Claims, 19 Drawing Sheets

SUPPORT LEG DEVICES AND CUTTING TOOLS HAVING THE SUPPORT LEG DEVICES

CROSS-REFERENCE TO RELATED APPLICATIONS

This application is a divisional of U.S. patent application Ser. No. 12/219,516 filed Jul. 23, 2008, which claims priority to Japanese Patent Application No. 2007-194566, filed Jul. 26, 2007, the contents of which are both incorporated herein by reference in their entirety.

BACKGROUND OF THE INVENTION

1. Field of the Invention

The present invention relates to support leg devices for cutting tools, such as table circular saws. The present invention also relates to cutting tools having support leg devices.

2. Description of the Related Art

A table circular saw is known that includes a base serving as a machine base, a turntable supported on the upper face of the base so as to be rotatable within a horizontal plane, and a cutting unit vertically pivotally supported on the rear portion of the base and via a support. The cutting unit has a circular cutting blade that is rotatably driven by an electric motor as a drive source. As the cutting unit is pivoted downwardly at a position above the turntable, the cutting blade cuts into a workpiece placed on the table, so that a cutting operation can be performed.

A slide-type table circular saw is also known that has a cutting unit supported such that the cutting unit can vertically pivot and can move along a cutting direction. With this table circular saw, it is possible to cut larger workpieces by moving the cutting unit in the cutting direction while the cutting unit is pivoted downward to cut into a workpiece.

The slide-type table circular saw is provided with a table extension protruding forward (toward the operator) at the front portion of the turntable to stably secure a large workpiece without need of increasing the diameter of the turntable. This table extension is provided with a support leg so that the circular saw can be installed stably on a floor or a workbench (installation surface) even when a large workpiece has been secured onto the table.

Japanese Laid-Open Utility Model Publication No. 4-130804, Japanese Laid-Open Utility Model Publication No. 5-41701 and Japanese Laid-Open Patent Publication No. 2003-245901 teach known support legs. The support legs disclosed in these publications are each provided on the lower face of the table extension so that its vertical position is adjustable, whereby the cutting tool can be installed stably without causing rattling movement by adjusting the position of the support leg so that the support leg is securely abutted against the installation surface (contacted with the ground).

However, since the support leg is brought to contact the installation surface for performing its function, when the turntable is rotated, the support leg may interact with the installation surface, and the turntable may not be rotated smoothly. Hence, in the case of the related art, it is necessary to loosen a locking screw for locking the support leg and to retract the support leg upward each time when required. Furthermore, it is also necessary to tighten the locking screw while the support leg is retracted and then to rotate the turntable after the support leg is lifted from the installation surface. Hence, a problem has existed that the operation is troublesome and the cutting tool is low in operability.

Therefore, there has been a need for support leg devices for cutting tools, which are improved in operability.

SUMMARY OF THE INVENTION

One aspect according to the present invention includes cutting tools that have a table for placing a workplace thereon. A cutting unit is mounted to the table. A support leg device includes a support leg, an operation member and a motion conversion mechanism. The motion conversion mechanism is coupled between the support leg and the operation member, so that the movement of the operation member is converted into the movement of the support leg.

BRIEF DESCRIPTIONS OF THE DRAWINGS

DETAILED DESCRIPTION OF THE INVENTION

Figure 1:
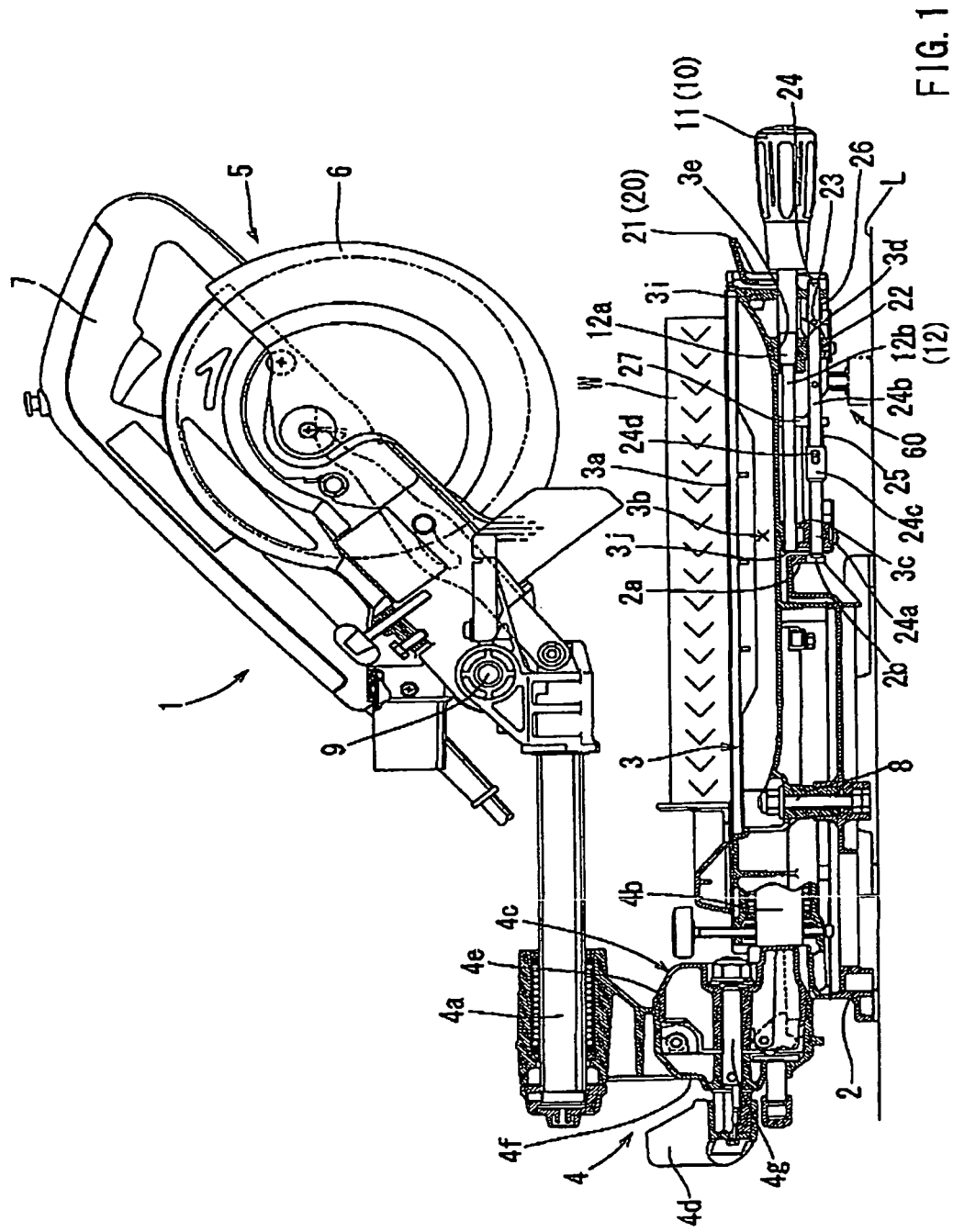
FIG. 1 is an overall side view showing a table circular saw equipped with a support leg according to a first embodiment of the present invention.

Each of the additional features and teachings disclosed above and below may be utilized separately or in conjunction with other features and teachings to provide improved support leg devices and cutting tools. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a cutting tool includes a turntable, on which a workpiece is placed, and a stopper device operable to lock and unlock the rotational position of the turntable. The support leg device includes a support leg for supporting the turntable against an installation surface. The support leg is movable, in response to the operation of the stopper device, between an upper retracting position, in which the support leg does not contact with the installation face, and a lower supporting position, in which the support leg can contact with the installation surface in an upright position.

With this configuration, the support leg can automatically move to the retracting position or automatically return to the supporting position in response to the operation of the stopper device for locking the rotation position of the turntable. Hence, the turntable can be rotated smoothly after the support leg has been retracted upward, and the turntable can be supported after the support leg has returned downward to the supporting position, without requiring any special operations, such as loosening and tightening of the locking screw for locking the support leg.

Because the support leg can be moved between the supporting position and the retracting position by using the operation of the members constituting the stopper device, the operator can smoothly rotate the turntable and can stably install the cutting tool, without carrying out any special operations, such as loosening and tightening of the locking screw.

In another embodiment, a support leg device includes a pivotal lever coupled to the support leg. As the lever pivots, the support leg moves between the retracting position and the supporting position.

With this configuration, the support leg can be retracted upward by simply pivoting the lever before the turntable is rotated. Hence, the turntable can be rotated smoothly. After the turntable has been rotated, the support leg can be returned to the supporting position by simply pivoting the lever in an opposite direction.

In a further embodiment, a support leg is tiltable relative to the turntable along a rotational direction of the turntable. A biasing device biases the support leg toward the supporting position.

With this configuration, the support leg is tiltable in the rotational direction of the turntable (the movement direction of the peripheral section of the turntable). Therefore, when the turntable is rotated, the support leg is automatically tilted rearward with respect to the rotational direction of the turntable by the resistance received from the installation face. When the support leg is tilted rearward with respect to the rotational direction of the turntable, its lower end is retracted in the direction of separating from the installation face. Hence, interaction of the support leg with the installation face can be avoided, and the turntable can be rotated smoothly. When the rotation operation of the turntable is stopped, the support leg is automatically returned to the supporting position to contact with the installation face by the biasing force of the biasing device. Since the support leg is automatically moved to the retracting position when the turntable is rotated and automatically returned to the supporting position when the rotational operation of the turntable is stopped, the operator can smoothly rotate the turntable, without carrying out any special operations for the support leg.

First to fourth embodiments according to the present invention will be described referring to FIGS. 1 to 23. FIG. 1 shows a slide-type table circular saw 1 equipped with a support leg device according to the first embodiment.

As shown in FIG. 1, the table circular saw 1 is used for installation on a working stand or a floor (hereafter referred to as "installation surface L"). The table circular saw 1 includes a base 2, a turntable 3, a support 4 installed on the rear portion of the base 2, and a cutting unit 5. The base 2 is placed on the installation surface L. The turntable 3 is horizontally rotatably supported on the base 2 via a rotation shaft 8. The turntable 3 is provided with a table extension 3a protruding radially from the front end (the right end as viewed in FIG. 1 and positioned on the side of the operator) of the turntable 3. The figure shows a blade intrusion slot 3b (relief opening for a cutting blade 6) provided so as to extend between the table extension 3a and the turntable 3.

The support 4 is equipped with two or upper and lower slide mechanisms 4a and 4b and a left-right tilting mechanism 4c. The cutting unit 5 is supported above the turntable 3 via the support 4. The cutting unit 5 can be slid in the cutting direction (horizontal direction) in a wide range using the upper and lower slide mechanisms 4a and 4b, thereby being capable of cutting a large workpiece W. Since the upper and lower slide mechanisms 4a and 4b each mainly include a slide bar and bearings for slidably supporting the slide bar. With the left-right tilting mechanism 4c, when a locking lever 4d is released, a tiltable member 4f can pivot relative to a stationary member 4e about a pivot shaft 4g in a left or right direction (in the direction perpendicular to the surface of the paper) with respect to the cutting direction (in the left-right direction in the FIG. 1). As a result, the cutting unit 5 and the upper slide mechanism 4a can be tilted within a certain range in the same direction. Therefore, a cutting operation, called oblique cutting operation can thus be carried out by pivoting the cutting unit 5 in the left or right direction with respect to the cutting direction.

The cutting unit 5 is supported such that it can pivot vertically about a pivot shaft 9 with respect to the upper slide mechanism 4a. The cutting unit 5 includes a cutting blade 6 having a circular shape, a drive motor (not shown in the figure) for rotating the cutting blade 6, and a handle 7 configured to be grasped by the operator.

The table circular saw 1 is equipped with the table extension 3a for stably holding the large workplace W. In correspondence to this, the cutting unit 5 can move over a long distance in the cutting direction using the upper and lower slide mechanisms 4a and 4b. When the cutting unit 5 moves toward the operator (to the right side in FIG. 1), the gravity center thereof also moves in the same direction, and a large load (pressing force) is applied from above to the table extension 3a during the cutting operation. As a result, there is a possibility that the installation state of the table circular saw 1 becomes unstable. Hence, the lower surface of the table extension 3a is provided with a support leg 60 for maintaining the table circular saw 1 in a stably installed state. The support leg 60 protrudes from the lower face of the table extension 3a so as to contact with the installation surface L in an upright state. Since the support leg 60 can mainly support the load applied on the side of the operator, the table circular saw 1 can be maintained in a stable position.

First and second stopper devices 10 and 20 are assembled with the table extension 3a. for locking the rotational position of the turntable 3. Rotating a grip 11 about its axis can operate the first stopper device 10. The grip 11 is supported so as to protrude further forward from the tip end of the table extension 3a. Vertically pivoting a lever 21 can operate the second stopper device 20. The lever 21 is provided also at the tip end of the table extension 3a.

The grip 11 of the first stopper device 10 also functions as a handle that can be held by the operator when the operator rotates the turntable 3, and is fixedly mounted to the front end portion of a first stopper rod 12. The first stopper rod 12 is axially movably supported by wall sections 3c, 3d, 27 and 3i of the table extension 3a.

The first stopper rod 12 is divided into two sections, i.e., a rod body 12b positioned on the rear side and a threaded shaft portion 12a positioned on the front side. The rod body 12b is axially movably supported by the two wall sections 3c and 27 positioned on the rear side, and the threaded shaft portion 12a is also axially movably supported by the two wall sections 3d and 3i positioned on the front side. The rod body 12b and the threaded shaft portion 12a are supported to have the same axis. The front end portion of the rod body 12b is in contact with the rear end portion of the threaded shaft portion 12a. The grip 11 is mounted to the front end portion of the threaded shaft portion 12a.

The rear side one of the two wall sections 3d and 3i on the front side, i.e., the wall section 3d, is provided with a threaded hole 3e, and the threaded shaft portion 12a of the first stopper rod 12 is engaged with the threaded hole 3e. Hence, the threaded shaft portion 12a can move in its axial direction as it rotates about its axis. The tip end portion (the left end portion in FIG. 1) of the rod body 12b is directed toward the side wall section 2a of the base 2. The side wall section 2a of the base 2 is curved along a circular arc about a support shaft 8 that serves as the rotation center of the turntable 3.

A contact plate 3j is mounted to the wall section 3c positioned on the rear side. The contact plate 3j is positioned between the tip end portion of the rod body 12b and the side wall section 2a of the base 2. The contact plate 3j has such a resiliency that can urge the rod body 12b to move toward the threaded shaft portion 12a. The urging force of the contact plate 3j can hold the rod body 12b normally in a state of contacting with the threaded shaft portion 12a, while being aligned with the threaded shaft portion 12a in the axial direction. In addition, since the contact plate 3j is interleaved between the rod body 12b and the side wall section 2a of the base 2, the side wall section 2a is prevented from being damaged (dented) by the rod body 12b, and its durability is enhanced.

As the operator rotates the grip 11 in the direction of tightening the threaded shaft portion 12a, the threaded shaft portion 12a rotates together with the grip 11 and moves leftward in FIG. 1. Hence, the rod body 12b abuts to the side wall section 2a of the base 2 with the intervention of the contact plate 3j, so that the rotation of the turntable 3 relative to the base 2 can be restricted, whereby the rotation position of the turntable 3 is locked.

As the operator rotates the grip 11 in the direction of loosening the threaded shaft portion 12a, the threaded shaft portion 12a rotates together with the grip 11 and moves forward in the axial direction (rightward in FIG. 1). Hence, the rod body 12b is pushed forward by the urging force of the contact plate 3j, and the tip end portion of the rod body 12b is separated from the side wall section 2a of the base 2, whereby the turntable 3 becomes rotatable.

On the other hand, the lever 21 of the second stopper device 20 is vertically pivotally supported by the wall section 3d of the table extension 3a via a support shaft 22. The lever 21 is connected to a second stopper rod 24 via a connecting shaft 23. The second stopper rod 24 is supported so as to be also movable in its axial direction (horizontal direction) while extending between the wall sections 3c and 3d. The second stopper rod 24 is supported so as to be parallel with the first stopper rod 12 at a position downward therefrom.

Figure 5:
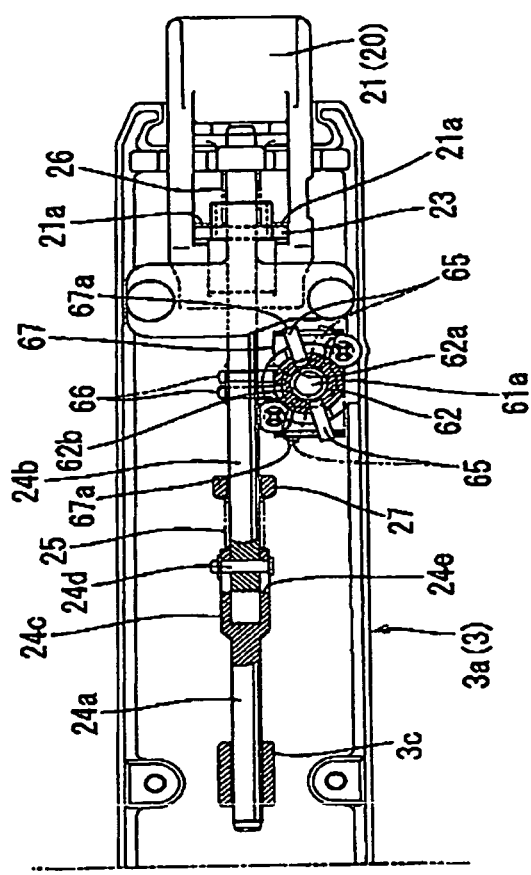
FIG. 5 is a plan sectional view showing the table extension and a plan view showing the second stopper device and the support leg device according to the first embodiment.

As shown in FIG. 5, the central section of the lever 21 is provided with a space as viewed from above and has a ring-like shape, that is, the shape of a roughly rectangular ring, as viewed from above. The rear end portion of the lever 21 is formed with a support shaft 22 that has a longitudinal axis in the left-right direction. The front portion of the lever 21 is bent upward and further bent forward so as to have a crank shape. The front end portion of the lever 21 is formed with an operation portion having a rectangular flat shape generally extending in the horizontal direction. The left and right inner walls of the lever 21 have a pair of left and right stepped portions 21a, the front sides of which extend outward. Each of the stepped portions 21a has an inclined face extending from above to below in the direction from the front side to the rear side. This inclined face is always in contact with the side face of the support shaft 22.

A compression spring 26 is interposed between the wall section 3i and the connecting shaft 23. This compression spring 26 biases the connecting shaft 23 rearward, whereby the connecting shaft 23 urges the lever 21 upward by virtue of the action of the inclined faces of the stepped portions 21a.

The second stopper rod 24 is divided into two sections, i.e., a rear rod 24a on the tip end side (on the left side in FIG. 1) and a front rod 24b on the front side (on the right side in FIG. 1, on the side of the operator). The rear rod 24a and the front rod 24b are connected to each other via a coupling shaft 24d of a connection section 24c of the second stopper rod 24 so that the rear rod 24a and the front rod 24b can move relative to each other in the axial direction within a certain range. Near the connection section 24c, a compression spring 25 is interleaved between the rear rod 24a and the wall section 27. Hence, the rear rod 24a is biased rearward in the direction of protruding rearward from the wall section 27.

The tip end portion of the second stopper rod 24 (i.e., the tip end portion of the rear rod 24a) configured as described above is also directed toward the side wall section 2a of the base 2. However, in the lower portion of the side wall section 2a, a plurality of positioning holes 2b are formed at equal intervals along a circular arc about the support shaft 8 serving as the rotation center of the turntable 3. The tip end portion of the second stopper rod 24 that is supported on the lower side of the first stopper rod 12 is directed toward the positioning holes 2b.

As the operator holds the grip 11 of the first stopper device 10 and pushes down the lever 21 with a fingertip of one of his or her fingers, the lever 21 pivots downward about the support shaft 22. As the lever 21 pivots downward, the connecting shaft 23 moves forward by virtue of the cam action of the inclined faces of the stepped portions 21a. The connecting shaft 23 is inserted into the front rod 24b in the direction perpendicular to the axial direction of the front rod 24b and extends in the left-right direction. Hence, as the connecting shaft 23 moves forward, the front rod 24b also moves forward. As the front rod 24b moves forward, the rear rod 24a also moves forward via the coupling shaft 24d against the biasing force of the compression spring 25.

As the second stopper rod 24 moves forward as described above, the tip end portion of the second stopper rod 24 is withdrawn from the positioning hole 2b, and the turntable 3 is permitted to rotate.

When the operator releases the downward pressing force applied to the lever 21 after the operator has rotated the turntable 3 and stopped the rotation at an approximate desired rotational position, the lever 21 returns upward by the biasing forces of the compression springs 25 and 26. As the lever 21 moves upward, the tip end portion of the rear rod 24a abuts to the side wall section 2a of the base 2, and the movement of the rear rod 24a is then stopped. Since the biasing force of the compression spring 26 is still applied to the rear rod 24a, the rearward movement of the front rod 24b continues. Since a slot 24e extending in the front-rear direction is provided at the portion in which the coupling shaft 24d of the connection section 24c is inserted, the further rearward movement of the front rod 24b is not hindered. The coupling shaft 24d moves close to the center of the slot 24e. The lever 21 returns to its upper locking position by the further rearward movement of the front rod 24b. Hence, even if the turntable 3 is positioned at an angle in which no positioning hole 2b opposes to the rod 24, the lever 21 may return upward.

With this arrangement, the lever 21 can completely return upward regardless of the angle of the turntable, thereby not hindering the operation of the grip 11.

When the operator finely adjusts the rotational position of the turntable 3 in the state where the rear rod 24a is in contact with the side wall section 2a of the base 2, the tip end portion of the rear rod 24a that is resiliently biased is inserted into one of the positioning holes 2b disposed closest thereto in the rotational direction. As a result, the turntable 3 can be positioned at the desired rotational position.

As described above, the table circular saw 1 according to this embodiment is provided with the turntable 3, and the rotational position (the angular position with respect to the cutting blade 6) of the turntable 3 can be locked by means of the first and second stopper devices 10 and 20. By the use of the first stopper device 10, the turntable 3 can be locked at any desired rotation position. On the other hand, by the use of the second stopper device 20, the turntable 3 can be locked accurately and promptly at one of the predetermined rotational positions that are frequently used.

The table extension 3a incorporating the first and second stopper devices 10 and 20 configured as described above and the turntable 3 are supported by the base 2 and a support leg device including a support leg according to each of embodiments described below. Hence, the table circular saw 1 can be installed stably. The support leg according to each embodiment can contact with the installation surface L perpendicularly thereto for supporting the table circular saw 1 stably. On the other hand, if it is desired to rotate the turntable 3, the support leg can retract from the installation surface L to allow the turntable 3 to rotate smoothly.

The detailed configuration of the support leg device according to the first embodiment is shown in FIGS. 2 to 9. The support leg device according to the first embodiment is configured to interlock with the operation of a stopper device, in particular the second stopper device 20. More specifically, a support leg 60 can move between a supporting position and a retracting position in response to the operation of the second stopper device 20.

The support leg 60 of the support leg device according to the first embodiment includes a leg body 61 having a threaded shaft portion 61a (support shaft portion) and a leg support 62 having a roughly cylindrical shape and supporting the leg body 61. The leg support 62 is supported within a concave section 63 formed on the lower face side of the table extension 3a, so that the leg support 62 can move vertically and can rotated about it axis within the concave section 63. Together with the leg support 62, the leg body 61 can move vertically between the supporting position and the retracting position. The threaded shaft portion 61a of the leg body 61 engages with a threaded hole 62a formed on the inner circumferential side of the leg support 62 so that the protruding length of the leg body 61 can be finely adjusted. Furthermore, a compression spring 64 is interleaved between the lower face of the leg support 62 and the leg body 61 in order to buffer the movement of the threaded shaft portion 61a with respect to the threaded hole 62a and to prevent the leg body 61 from loosening.

Figure 7:
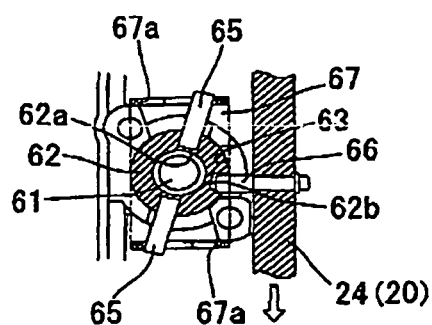
FIG. 7 is a sectional view taken on line (7)-(7) of FIG. 6 and a plan view showing the positional relationship between a second stopper rod and a leg support.
Figure 9:
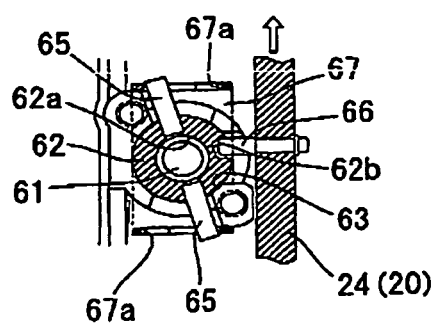
FIG. 9 is a sectional view taken on line (9)-(9) of FIG. 8 and a plan view showing the positional relationship between the second stopper rod and the leg support.

As shown in FIGS. 5, 7 and 9, a connecting member 66 is mounted to the front rod 24b of the second stopper rod 24 of the second stopper device 20. In this embodiment, a pin having a cylindrical shape is used as the connecting member 66. The connecting member 66 is fixed to the front rod 24b so as to protrude in a radial direction (sideways) thereof. Hence, the connecting member 66 moves horizontally in the front-rear direction (in the left-right direction in FIG. 5) together with the second stopper rod 24, as the lever 21 of the second stopper device 20 pivots vertically. The connecting member 66 extends into the concave section 63 such that the connecting member 66 can move in the horizontal direction. The tip end portion of the connecting member 66 is inserted into an engaging hole 62b formed in the leg support 62. Hence, when the second stopper rod 24 moves in its axial direction as the second stopper device 20 is operated, the connecting member 66 moves horizontally in the same direction as the second stopper rod 24. As a result, the leg support 62 is rotated (forward/rearward rotation) by a certain angle about its axis.

Figure 6:
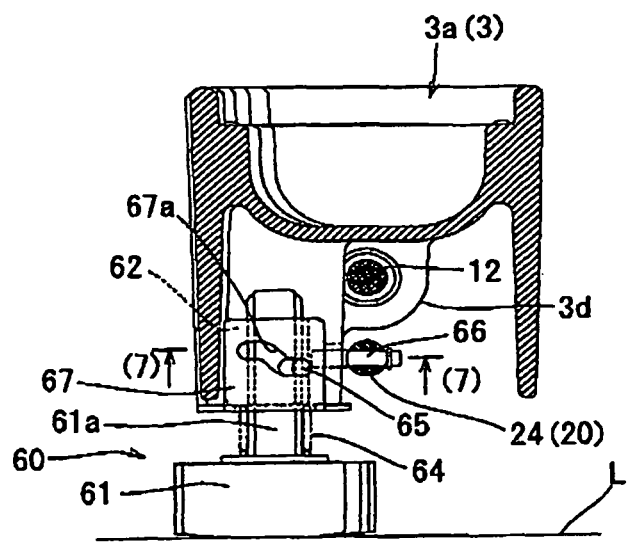
FIG. 6 is a vertical sectional view showing the table extension, taken on line (6)-(6) of FIG. 2, and showing a state in which engaging members are positioned at the lower steps of cam slots and the support leg is positioned at the supporting position.
Figure 8:
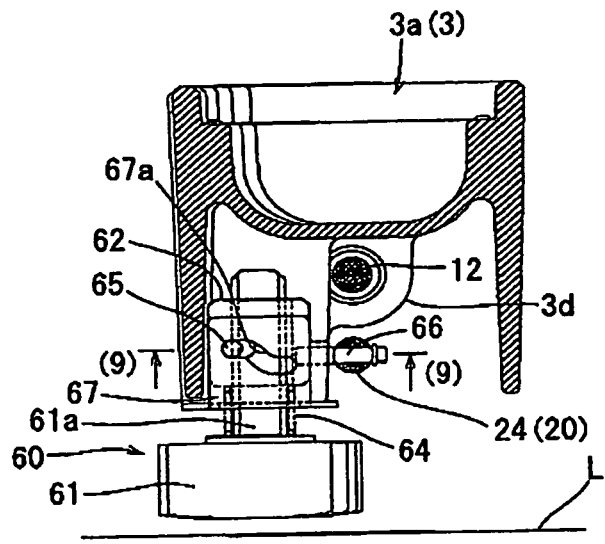
FIG. 8 is a vertical sectional view showing the table extension, taken on line (8)-(8) of FIG. 3, and showing a state in which the engaging members are positioned at the upper steps of the cam slots and the support leg is positioned at the retracting position.

Two engaging members 65 are mounted to the lateral side of the leg support 62 and protrude in the radial direction (sideways) of the leg support 62 from positions opposite to each other on the circumference of the leg support 62. The two engaging members 65 extend along the same axis with each other, which axis intersects with the rotational axis of the leg support 62. The two engaging members 65 protrude toward the outer circumferential side of the concave section 63, and their tip end portions are respectively inserted into cam slots 67a. The cam slots 67a are formed in a cam plate 67. The cam plate 67 is fixed to the lower portion of the concave section 63 and defines a bottom of the concave section 63. The cam plate 67 serves to prevent the leg support 62 from being removed from the inside of the concave section 63. The cam plate 67 has opposite side portions that are bent so as to rise upward along the side wall of the concave section 63. The cam slots 67a are respectively formed in the opposite side portions. As shown in FIGS. 6 and 8, the two cam slots 67a are formed to have a shape such that the leg support 62 moves by a certain distance in the axial direction as the leg support 62 rotates about its axis.

Figure 2:
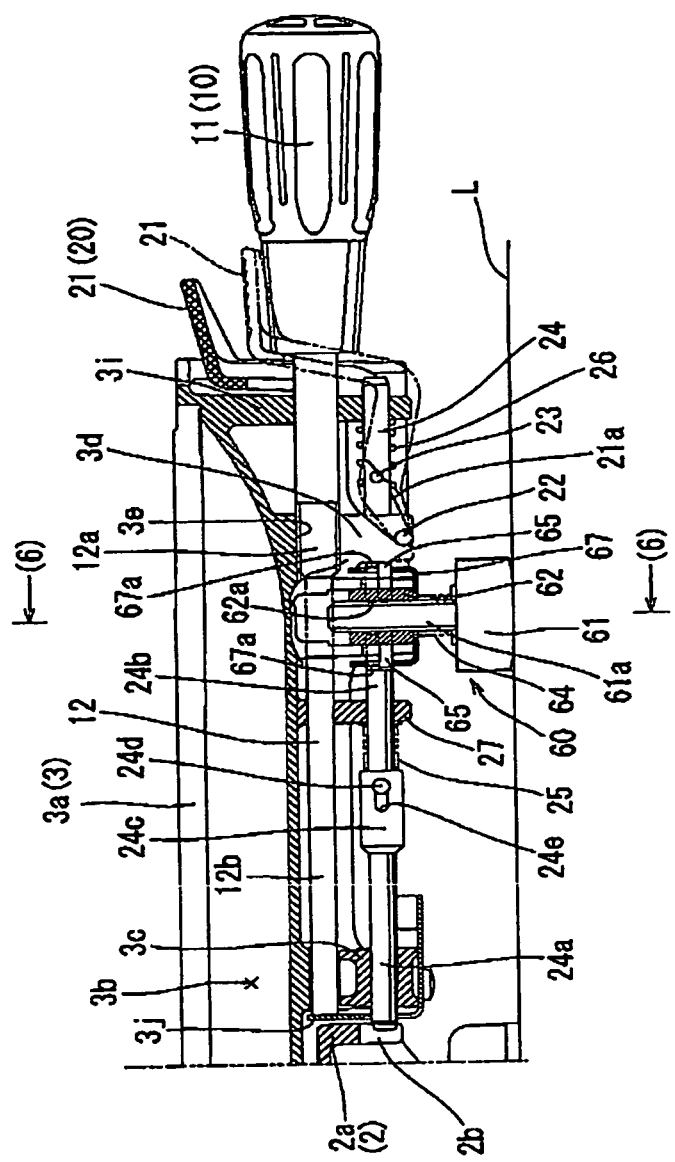
FIG. 2 is a vertical sectional view showing a table extension and a vertical sectional view showing a support leg device according to the first embodiment, wherein the support leg is positioned at its supporting position.

With the support leg device according to the first embodiment configured as described above, as the operator pivots the lever 21 of the second stopper device 20 downward with his fingertip as indicated by the alternate long and short dashes lines in FIG. 2 for permitting rotation of the turntable 3, the second stopper rod 24 moves rightward in FIGS. 2 to 5 (forward).

Figure 3:
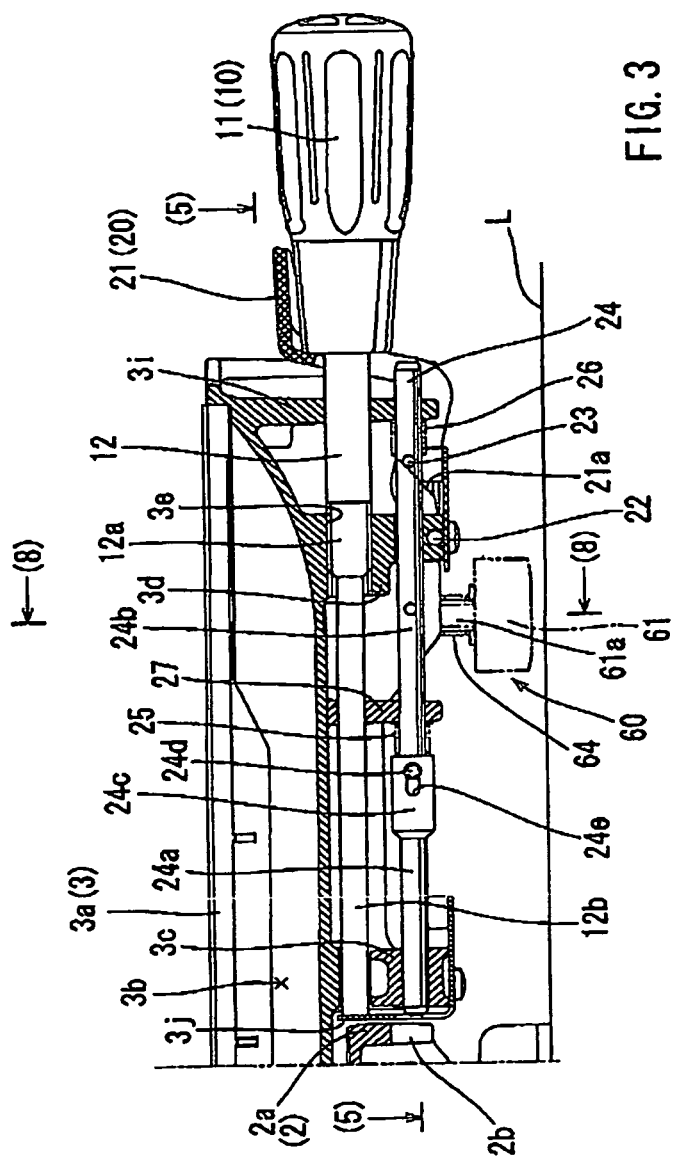
FIG. 3 is a vertical sectional view showing the table extension and a vertical sectional view showing the support leg device according to the first embodiment, wherein the support leg is positioned at its retracting position.

As the second stopper rod 24 moves forward (upward in FIG. 9), the connecting member 66 moves horizontally forward together with the second stopper rod 24. As the connecting member 66 moves horizontally forward, the leg support 62 is turned counterclockwise in FIG. 9 by a certain angle. When the leg support 62 is turned counterclockwise in FIG. 9, the two engaging members 65 moved to the upper side portions of the cam slots 67a, respectively, as shown in FIG. 8. Since the two engaging members 65 are integrated with the leg support 62, the leg support 62 moves upward as the two engaging members 65 moves to the upper sides portions of the cam slots 67a. As a result, the leg body 61 of the support leg 60 moves upward so as to be lifted from the installation surface L. The state of the leg body 61 lifted from the installation surface L is shown in FIGS. 3 and 8.

As the lever 21 pivots downward, the tip end portion of the second stopper rod 24 is removed from the positioning hole 2b of the base 2 as described above. As a result, the turntable 3 is permitted to rotate, and the leg body 61 is automatically moved to its retracting position above the installation surface L. Hence, the operator can rotate the turntable 3 promptly and smoothly by simply releasing the first and second stopper devices 10 and 20, without carrying out the troublesome operations of loosening the locking screw and moving the support leg upward to the retracting position.

Conversely, when the pressing down operation of the lever 21 is released for locking the rotational position of the turntable 3, the lever 21 returns upward by the biasing forces of the compression springs 25 and 26, the second stopper rod 24 moves forward, and the tip end portion of the second stopper rod 24 is inserted into one of the positioning holes 2b positioned to be opposed thereto, whereby the rotational position of the turntable 3 can be fixed. This state is shown in FIG. 2. Furthermore, in conjunction with the rearward movement (in the direction indicated by an outline arrow in FIG. 7) of the second stopper rod 24, the leg support 62 rotates clockwise in FIG. 7, whereby the two engaging members 65 move to the lower side portions of the cam slots 67a and 67a, respectively, as shown in FIG. 6. As the two engaging members 65 are move to the lower side portions of the cam slots 67a, respectively, the leg support 62 moves downward together with the engaging members 65, whereby the leg body 61 moves downward to the supporting position and contacts with the installation surface L.

With the support leg device according to the first embodiment configured as described above, when the operation of the lever 21 for releasing the positioning of the turntable 3 by the second stopper device 20 is stopped, the lever 21 returns upward, and the rotational position of the turntable 3 is locked. In conjunction with this operation, the leg body 61 of the support leg 60 automatically returns downward to the supporting position and contacts with the installation surface L. For this reason, the troublesome operation of tightening the locking screw to lock the support leg is not required to be carried out by the operator.

Figure 4:
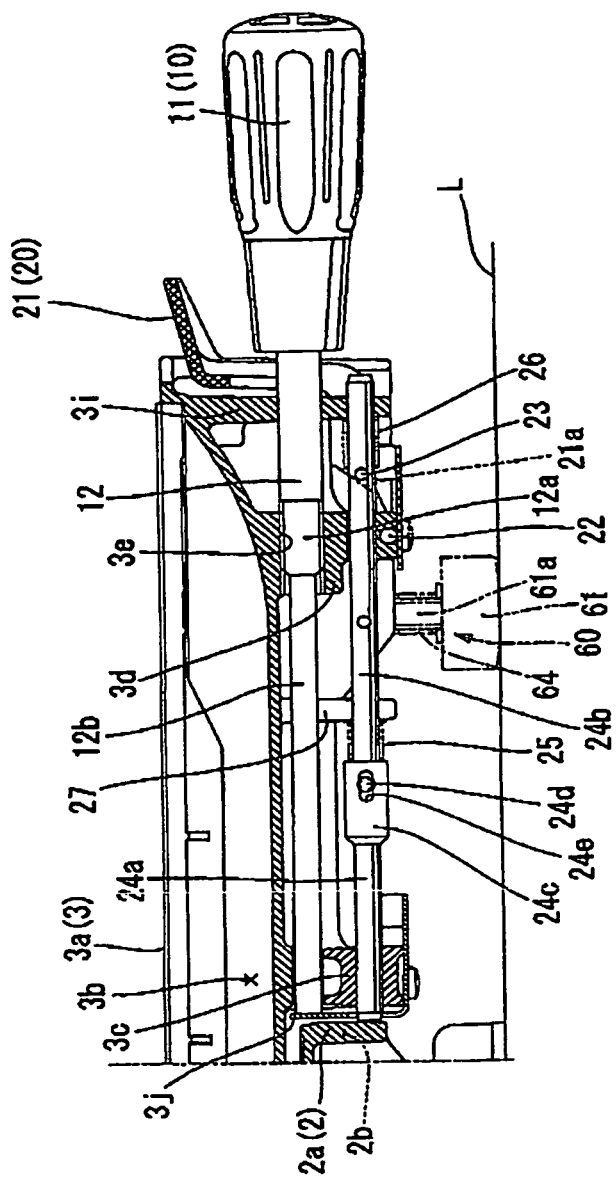
FIG. 4 is a vertical sectional view showing the table extension, wherein the tip end portion of the rear rod of a second stopper device is not aligned with a positioning hole but abutted against the side wall section of the base and the support leg is grounded even in this state.

In addition, the second stopper rod 24 of the second stopper device 20 is divided into the rear rod 24a and the front rod 24b, the two rods 24a and 24b are permitted to move relatively to each other in the axial direction, and the rear rod 24a is biased forward by the compression spring 25. With this configuration, there occurs a state in which the rear rod 24a is not inserted into any of the positioning holes 2b because it buts to a portion of the side wall section 2a of the base 2 between the positioning holes 2b and 2b adjacent to each other, depending on the position of the turntable 3. In the case of this state, the turntable 3 can be fixed in position by the operation of the first stopper device 10. The state of this positioning is shown in FIG. 4. Even in the case of this state, since the vertical movement of the support leg 60 is interlocked with only the front-rear movement of the front rod 24b and is not interlocked with the front-rear movement of the rear rod 24a. Therefore, as the front rod 24b returns rearward by the biasing force of the compression spring 26 as indicated by the outline arrow in FIG. 7, the two engaging members 65 move to the lower side portions of the cam slots 67a, respectively, and the leg support 62 moves downward together with the engaging members 65. As a result, the leg body 61 moves downward to the supporting position and contacts with the installation surface L as shown in FIG. 4.

Accordingly, even in the state in which the front rod 24a is not inserted into any one of the positioning holes 2b of the base 2, the leg body 61 automatically returns to the supporting position and can securely contact with the installation surface L as the lever 21 returns to the locking position.

Next, a support leg device according to a second embodiment is shown in FIGS. 10 to 15. The support leg device according to the second embodiment is different from that according to the first embodiment in that the support leg device is not interlocked with the stopper device but is operated by the operation of a lever.

A support leg 40 of the support leg device according to the second embodiment includes a leg body 41 having a threaded shaft portion 41a (support shaft portion), a leg support 42 having a roughly cylindrical shape, and a lever 43 operable by the operator with his fingertip. The leg support 42 is supported inside a concave section 44 formed on the lower face side of the table extension 3a and can move vertically within the concave section 44. The leg support 42 is supported inside the concave section 44 such that the leg support 42 cannot rotate about its axis.

A flange 42b is formed on the upper portion of the leg support 42 and extends radially outward therefrom. A compression spring 45 is interleaved between the flange 42b and the bottom of the concave section 44 around the circumference of the leg support 42. The leg support 42 is biased upward by the compression spring 45. A threaded hole 42a is formed on the inner circumferential side of the leg support 42. The threaded shaft portion 41a of the leg body 41 is screwed into the threaded hole 42a from below. The downward protruding length of the leg body 41 from the leg support 42 or from the table extension 3a can be finely adjusted by adjusting the screwing amount of the threaded shaft portion 41a into the threaded hole 42a. In this respect, the support leg 40 is similar to the support leg 60 according to the first embodiment. Furthermore, a compression spring 49 is interleaved between the leg body 41 and the lower face of the leg support 42 to buffer the movement of the threaded shaft portion 41a with respect to the threaded hole 42a and to prevent the leg body 41 from loosening. In this respect, the second embodiment is also similar to the first embodiment.

On the other hand, an actuating shaft 46 is supported within the upper portion of the concave section at a position above the leg support 42 such that the actuating shaft 46 can rotate within the concave section 44. More specifically, the actuating shaft 46 is supported to extend between the opposed walls of the concave section 44. The actuating shaft 46 is prevented from moving in its axial direction by means of a stop ring 47 attached to one end of the actuation shaft 46. The actuating shaft 46 has a section 46a with a pair of opposite flat faces (hereinafter also called "two-face width section 46a") along the substantially entire length in an axial direction. An actuating member 48 is mounted to the actuating shaft 46 such that the actuating member 48 cannot rotate relative to the actuation shaft 46 by virtue of the action of the two-face width section 46a. The actuating member 48 is provided with two actuating pieces 48a and 48a extending in the radial direction.

The lever 43 is attached to the other end of the actuating shaft 46 that extends through the wall of the concave section 44 and protrudes outward from one side the table extension 3a.

Figure 10:
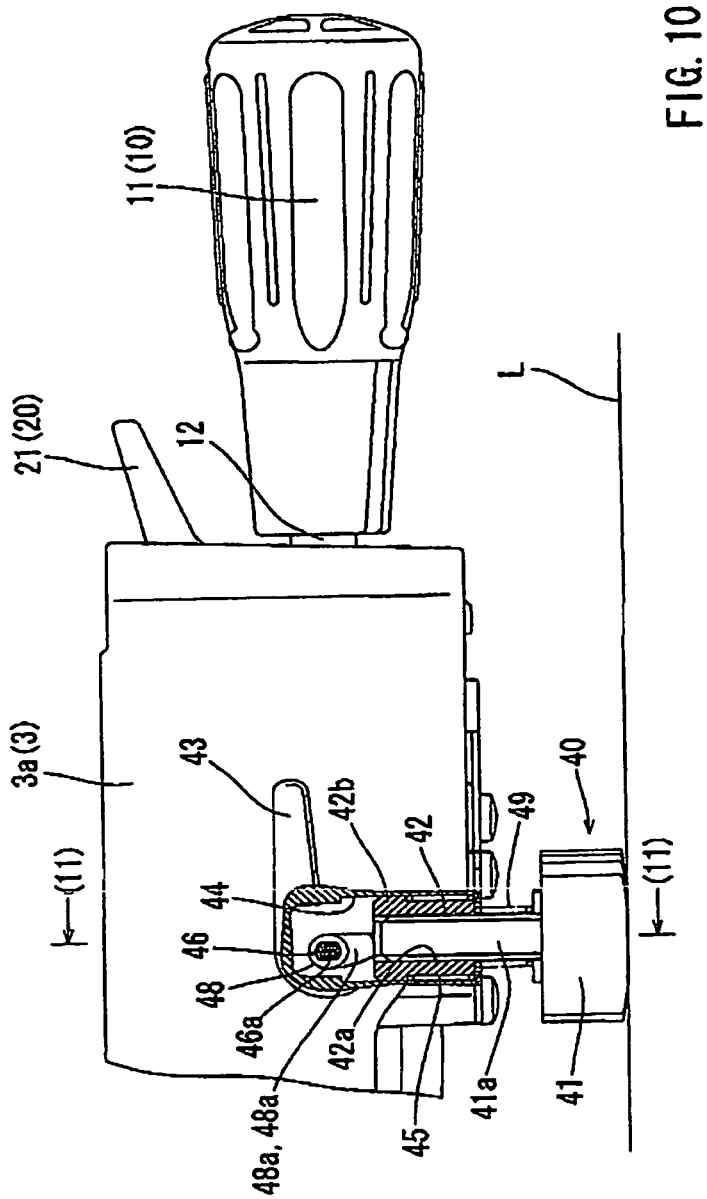
FIG. 10 is a view showing the tip end portion of a table extension and is a partially cutaway side view showing a support leg device according to a second embodiment, wherein the support leg is positioned at the supporting position.
Figure 11:
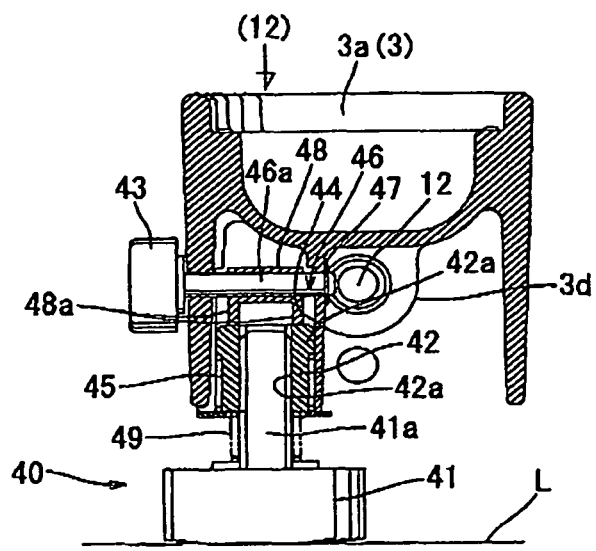
FIG. 11 is a vertical sectional view showing the table extension, taken on line (11)-(11) of FIG. 10.
Figure 12:
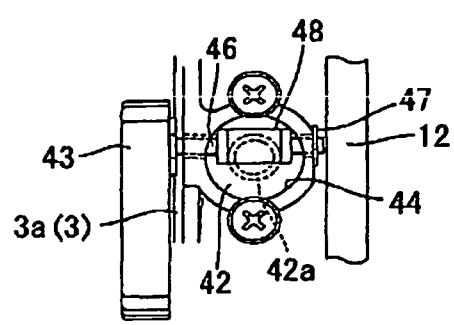
FIG. 12 is a plan view showing the support leg device according to the second embodiment, as viewed from arrow (12) in FIG. 11.

With the support leg device according to the second embodiment configured as described above, as the operator pivots the lever 43 downward toward the side of the operator as shown in FIG. 10 (clockwise in FIG. 10), the two actuating pieces 48a of the actuating member 48 move downward as shown in FIG. 11. As a result, the two actuating pieces 48a and 48a are pressed against the upper face of the leg support 42, and the leg support 42 is pushed downward. Hence, the leg support 42 moves downward against the compression spring 45, whereby the leg body 41 of the support leg 40 supported by the leg support 42 moves downward and is held in its supporting position. When held at the supporting position, the leg body 41 perpendicularly abuts to the installation surface L. Consequently, the table extension 3a and the turntable 3 are supported with respect to the installation surface L, whereby the table circular saw 1 can be installed stably.

Figure 13:
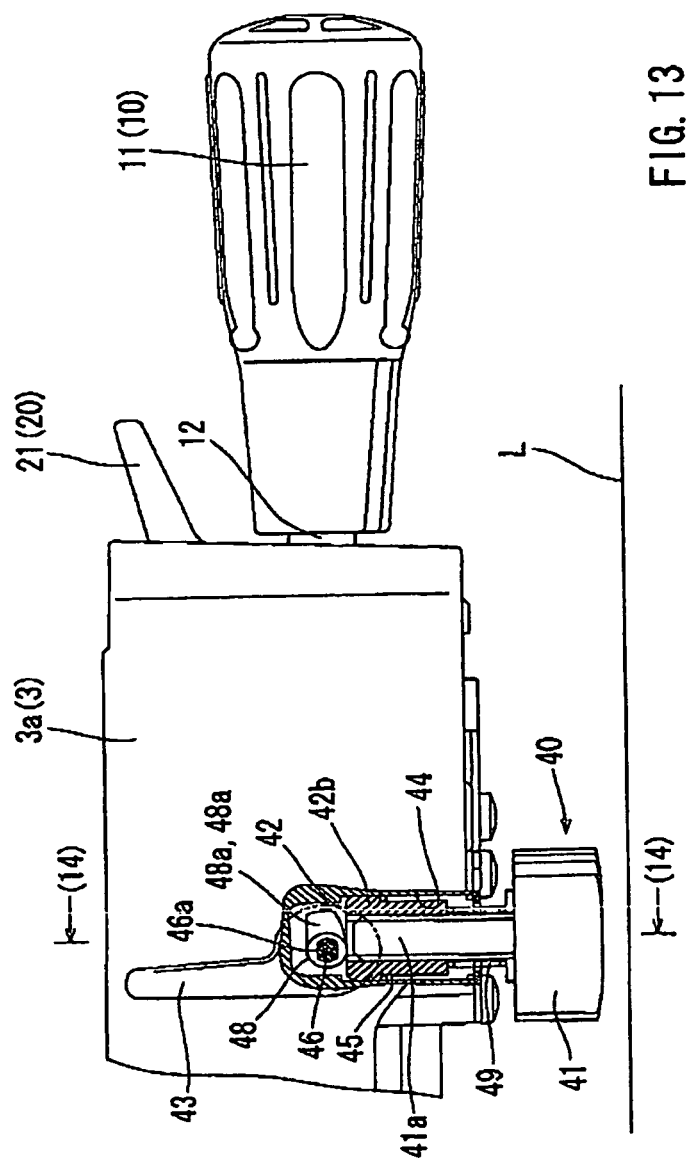
FIG. 13 is a view showing the tip end portion of the table extension and is a partially cutaway side view showing the support leg device according to the second embodiment, wherein the support leg is positioned at the retracting position.
Figure 14:
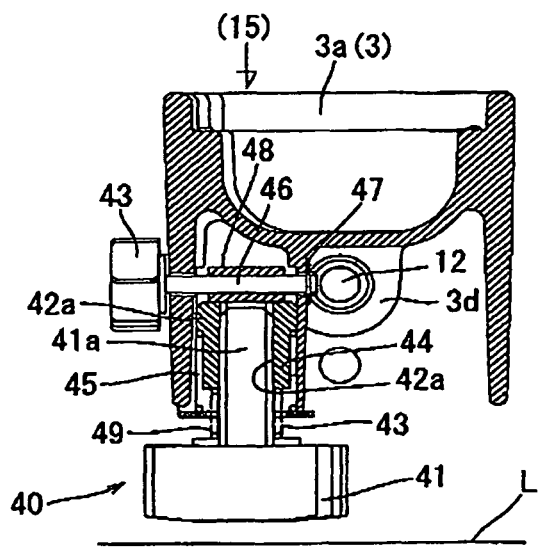
FIG. 14 is a vertical sectional view showing the table extension, taken on line (14)-(14) of FIG. 13.
Figure 15:
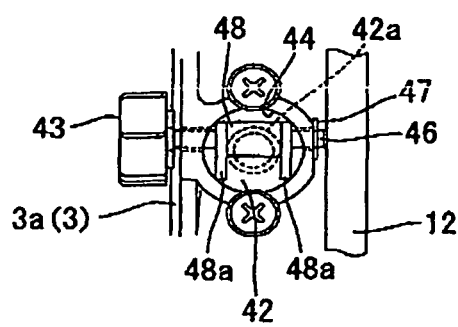
FIG. 15 is a plan view showing the support leg device according to the second embodiment, as viewed from arrow (15) in FIG. 14.

On the other hand, when the operator pivots the lever 43 upward in a rising direction as shown in FIG. 13 (counterclockwise in FIG. 13), the two actuating pieces 48a of the actuator 48 move upward away from the upper face of the leg support 42. As a result, the leg support 42 moves upward by the biasing force of the compression spring 45, whereby the leg body 41 moves upward to the retracting position. As the leg body 41 moves upward to the retracting position, it is separated from the installation surface L.

With the support leg device according to the second embodiment configured as described above, as the operator pivots the lever 43, the leg body 41 of the support leg 40 moves downward to the supporting position in which the leg body 41 contacts with the installation surface L, or the leg body 41 can move upward to the retracting position in which the leg body 41 is separated from the installation surface L as described above. As a result, it is possible to smoothly rotate the turntable 3 and it is also possible to support the table extension 3a with respect to the installation surface L while the turntable 3 is locked at a desired rotational position, by simply pivoting the lever 43. It is not necessary to perform troublesome operations of loosening the locking screw and moving the support leg upward, or tightening the locking screw while the support leg contacts with the installation surface.

Next, a support leg device according to a third embodiment is shown in FIGS. 16 to 19. The support leg device according to the third embodiment is similar to the support leg device according to the first embodiment in that the support leg device is interlocked with a stopper device. However, the support leg device according to the third embodiment is different from that of the first embodiment in that a support leg 50 moves between a supporting position and a retracting position in conjunction with the operation of the first stopper device 10.

The support leg 50 includes a leg body 51 having a threaded shaft portion 51a (support shaft portion) and a leg support 52 having a roughly cylindrical shape for supporting the leg body 51. The leg support 52 is supported inside a concave section 53 formed on the lower face side of the table extension 3a and can move vertically within the concave section 53. The threaded shaft portion 51a of the leg body 51 engages with a threaded hole 52a formed on the inner circumferential side of the leg support 52 so that the protruding length of the leg body 51 can be finely adjusted. Furthermore, a compression spring 54 is interleaved between the lower face of the leg support 52 and the leg body 51 to buffer the movement of the threaded shaft portion 51a with respect to the threaded hole 52a. In these respects, the third embodiment is similar to the first and second embodiments.

The support leg device according to the third embodiment has an actuating member 55 disposed between the leg support 52 and the afore-mentioned first stopper device 10. The leg body 51 can move to the supporting position and to the retracting position by the operation of the first stopper device 10 via the actuating member 55. The actuating member 55 has side walls 55a and 55b disposed in the left-right direction as viewed from the operator and a front wall 55c disposed on the front side as viewed from the operator. The actuating member 55 is supported on the lower face side of the tip end of the table extension 3a via a support shaft 56 that extends between the left and right side walls 55a and 55b. The actuating member 55 can vertically pivot about the support shaft 56. In addition, the actuating member 55 has an actuating shaft 57 mounted to the tip end (the left end in FIGS. 16 and 18) of the side wall 55a on the left side as viewed from the operator (on the front face side in FIGS. 16 and 18). The actuating shaft 57 extends through the side wall of the table extension 3a and is engaged with the side portion of the leg support 52. The side portion of the leg support 52 is provided with an engaging groove 52b elongated in the horizontal direction. The tip end portion of the actuating shaft 57 is inserted into the engaging groove 52b. Inside the engaging groove 52b, the actuating shaft 57 can move in the front-rear direction (in the left-right direction in FIGS. 16 and 18). Furthermore, in the side wall of the table extension 3a, relief hole 3h having a width substantially equal to that of the engaging groove 52b is formed to have such a shape as being cut from the lower end of the side wall. The actuating shaft 57 extends through the side wall via this relief hole 3h.

Figure 16:
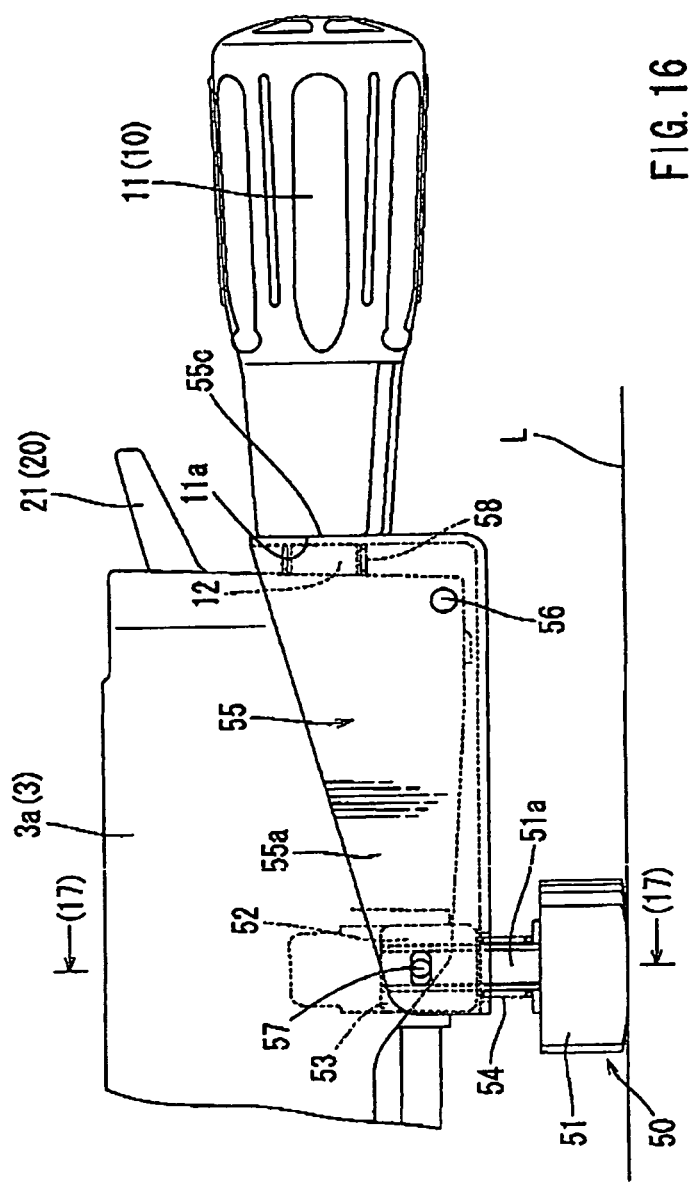
FIG. 16 is a view showing the tip end portion of a table extension and is a partially cutaway side view showing a support leg device according to a third embodiment, wherein the support leg is positioned at the supporting position.
Figure 17:
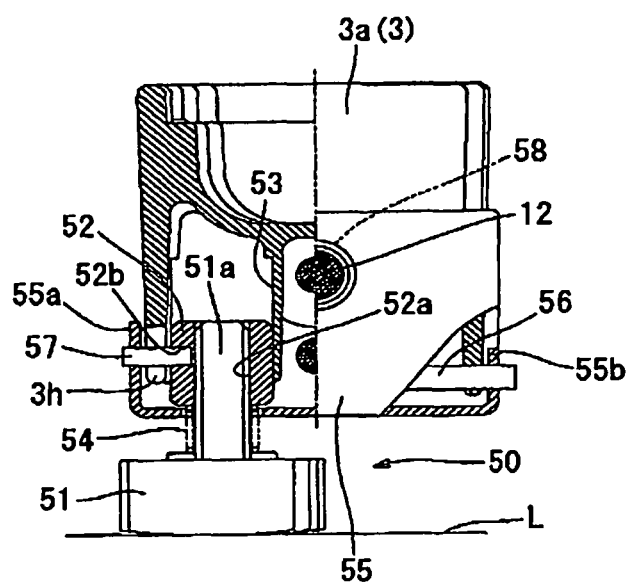
FIG. 17 is a vertical sectional view showing the table extension, taken on line (17)-(17) of FIG. 16.
Figure 18:
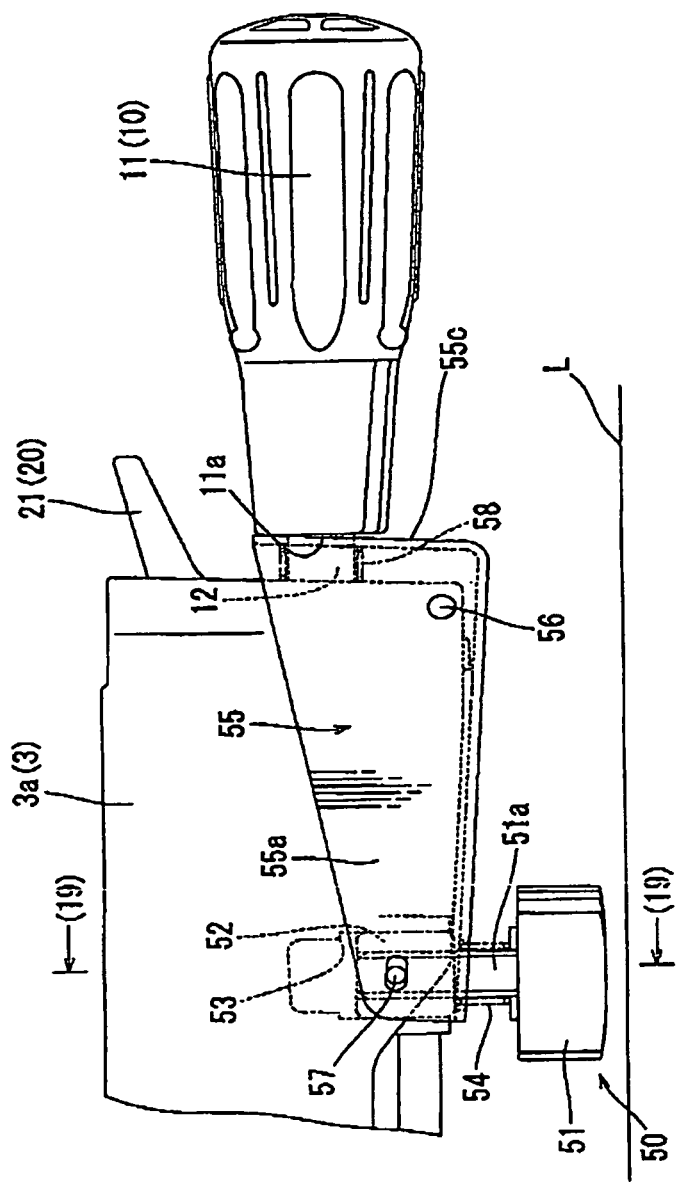
FIG. 18 is a view showing the tip end portion of the table extension and is a partially cutaway side view showing the support leg device according to the third embodiment, wherein the support leg is positioned at the retracting position.
Figure 19:
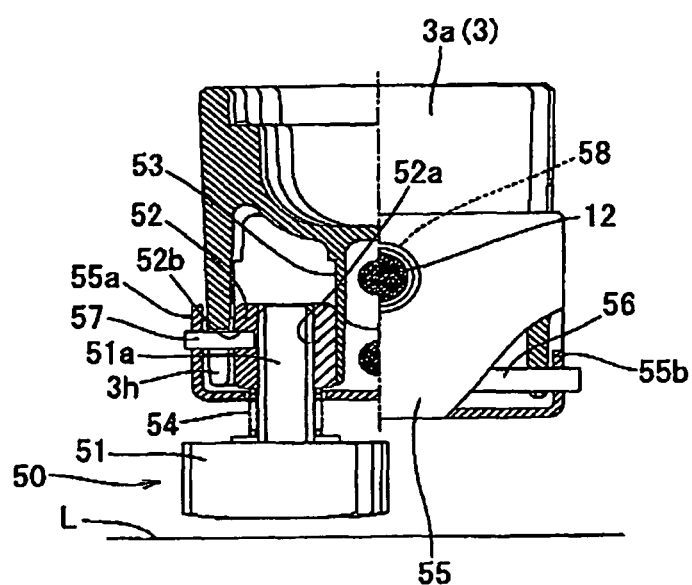
FIG. 19 is a vertical sectional view showing the table extension, taken on line (19)-(19) of FIG. 18.

On the other hand, the front wall 55c of the actuating member 55 opposes to the rear end face 11a of the grip 11 of the first stopper device 10 as shown in FIGS. 16 and 18. A compression spring 58 is interleaved between the front wall 55c and the tip end face of the table extension 3a and around the circumference of the threaded shaft portion 12a of the first stopper rod 12. The front wall section 55c is biased in the direction toward the rear end face 11a of the grip 11 by the compression spring 58. Hence, the actuating member 55 is biased in the clockwise direction about the support shaft 56 in FIGS. 16 and 18.

For this reason, as the operator rotates the grip 11 in the unlocking direction in order to release the locking state of the turntable 3 by the first stopper device 10, the grip 11 moves rightward as shown in FIG. 18, whereby the front wall 55c of the actuating member 55 is pushed by the compression spring 58 to move rightward as shown in FIG. 18. As a result, the actuating member 55 pivots clockwise as shown in FIG. 18. As the actuating member 55 pivots clockwise, the actuating shaft 57 moves upward, and the leg support 52 and the leg body 51 move upward. As the leg body 51 moves upward, the leg body 51 is separated from the installation surface L. FIG. 18 shows this state.

Conversely, when the operator rotates the grip 11 in the locking direction to lock the rotational position of the turntable 3 by the first stopper device 10, the grip 11 moves leftward as shown in FIG. 16, whereby the front wall 55c of the actuating member 55 is pushed by the rear end face 11a of the grip 11 against the biasing force of the compression spring 58 so as to move rearward. As the front wall section 55e moves rearward, the actuating member 55 pivots counterclockwise about the support shaft 56 as shown in FIG. 16. As the actuating member 55 pivots counterclockwise, the actuating shaft 57 moves downward, and the leg support 52 and the leg body 51 move downward. As the leg body 51 moves downward, the leg body 51 is brought to perpendicularly abut to the installation surface L, so that loads, etc. that may be applied to the table extension 3a and the turntable 3 can be received by the leg body 51. As a result, the table circular saw 1 can be installed stably.

With the support leg device according to the third embodiment configured as described above, as the rotational position of the turntable 3 is locked by rotating the grip 11 of the first stopper device 10 toward a lock direction, the leg body 51 automatically extends to a supporting position in conjunction with the locking operation. Conversely, as the turntable 3 is permitted to rotate by the rotation of the grip 11 toward an unlocking position, the leg body 51 of the support leg 50 automatically retracts to the retracting position in conjunction with the unlocking operation. As described above, the leg body 51 extends to the supporting position or, conversely, retracts to the retracting position in conjunction with the operation of the first stopper device 10 that is used to lock the turntable 3 at a desired rotational position so as make the turntable 3 unrotatable. Hence, the operator can smoothly rotate the turntable 3 and can promptly position the turntable 3, without carrying out the troublesome operations of loosening and tightening the locking screw.

Next, a support leg device according to a fourth embodiment is shown in FIGS. 20 to 23. A support leg 30 of the support leg device according to the fourth embodiment includes a leg body 31 that can contact with the installation surface L and a rotary support 32 for supporting the leg body 31. The rotary support 32 has a cylindrical shape and is rotatably supported inside of a concave section 37 provided in the lower face of the table extension 3a. The rotary support 32 can rotate about an axis J oriented in the diametrical direction of the turntable 3 (i.e., in the radial direction of the support shaft 8). The rotary support 32 is provided with a threaded hole 32a. The threaded hole 32a extends throughout the rotary support 32 in the diametrical direction thereof. The threaded shaft portion 31a (support shaft portion) of the leg body 31 engages with the threaded hole 32a, whereby the leg body 31 is supported in a state of protruding from the side portion of the rotary support 32 in the radial direction.

The protruding length of the leg body 31 from the table extension 3a can be finely adjusted by adjusting the screwing amount of the threaded shaft portion 31a into the threaded hole 32a. A compression spring 33 is interleaved between the leg body 31 and the rotary support 32 and around the threaded shaft portion 31a. This compression spring 33 biases the leg body 31 in the direction of protruding from the rotary support 32. In addition, the compression spring 33 may buffer the movement of the threaded shaft portion 31a with respect to the threaded hole 32a.

Figure 21:
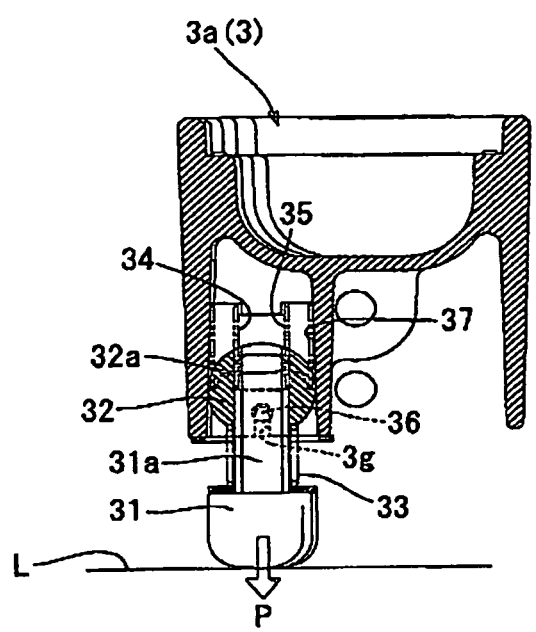
FIG. 21 is a vertical sectional view showing the table extension, taken on line (21)-(21) of FIG. 20.
Figure 23:
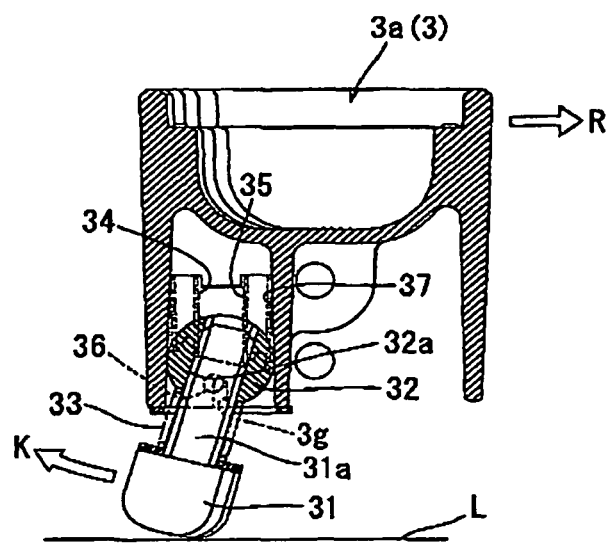
FIG. 23 is a vertical sectional view showing the table extension, taken on line (23)-(23) of FIG. 22.

As shown in FIGS. 21 and 23, as the rotary support 32 rotates about its axis J (rotation about its own axis), the leg body 31 moves between the supporting position and the retracting position. In the supporting position, the leg body 31 is perpendicularly contacts with the installation surface L. In the retracting position, the leg body 31 has pivoted upward (forward or rearward in the rotational direction of the turntable 3) and the tip end portion of the leg body 31 has moved in the direction of separating from the installation surface L.

Two compression springs 34 and 35 having the same biasing force are interleaved between the rotary support 32 and the upper face of the concave section 37. The compression spring 34 biases the rotary support 32 to rotate about its axis in a counterclockwise direction as viewed in FIG. 21, while the compression spring 35 biases the rotary support 32 to rotate in a clockwise direction. Since the rotary support 32 is biased to rotate in opposite rotational directions by the two compression springs 34 and 35, the leg body 31 is biased toward the supporting position and is held at the supporting position.

Figure 20:
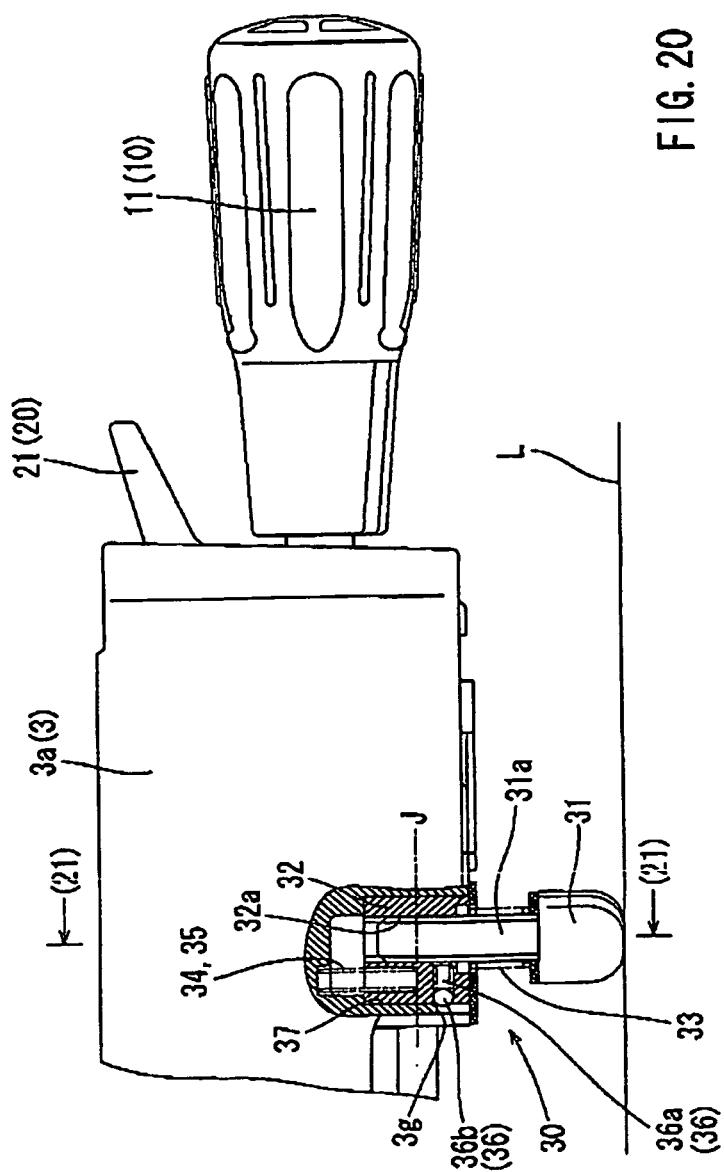
FIG. 20 is a view showing the tip end portion of a table extension and is a partially cutaway side view showing a support leg device according to a fourth embodiment, wherein the support leg is positioned at the supporting position.
Figure 22:
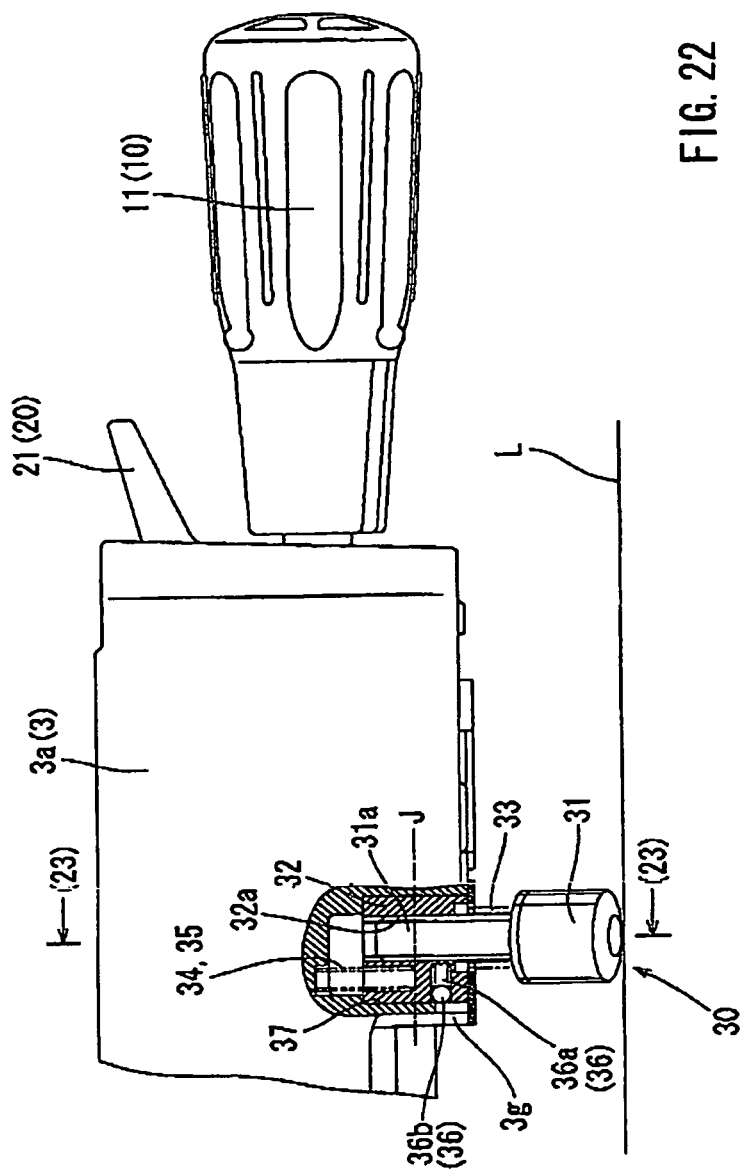
FIG. 22 is a view showing the tip end portion of the table extension and is a partially cutaway side view showing the support leg device according to the fourth embodiment, wherein the support leg is positioned at the retracting position.

In addition, as shown in FIGS. 20 and 22, a position holding device (called "detest device" or "ball plunger) 36 is disposed at the end portion of the rotary support 32. The position holding device 36 has a steel ball 36b biased toward the protruding side by a compression spring 36a. At a position opposing to the position holding device 36, an engaging slot 3g is provided in the wall of the concave section 37. The engaging slot 3g has a width through which the steel ball 36b cannot pass. When the leg body 31 reaches the supporting position, the steel ball 36b of the position holding device 36 resiliently engages the engaging slot 3g, whereby the support leg 30 is held in position. As a result, by virtue of the position holding device 36, the leg body 31 is also held at the supporting position in which the leg body 31 contacts perpendicularly with the installation surface L.

With the support leg device according to the fourth embodiment configured as described above, the rotary support 32 is supported while being biased to rotate about the axis J in opposite directions by the two compression springs 34 and 35, and the rotational position of the rotary support 32 can be held by the position holding device 36, whereby the leg body 31 can be held at the supporting position in which the leg body 31 can contact perpendicularly with the installation surface L. FIG. 21 shows this state. As described above, in the state in which the turntable 3 is prevented from rotating (during cutting, etc.), the leg body 31 of the support leg 30 can be held at the supporting position, whereby a load P (including the weights of the tool itself and the workpiece, a cutting load of the workpiece, etc.) that may be applied to the turntable 3 and the table extension 3a can be received by the support leg 30 as indicated by an outline arrow in FIG. 21. As a result, the table circular saw 1 can be installed stably on the installation surface L.

Furthermore, the leg body 31 of the support leg 30 is supported so as to be tiltable rearward with respect to each of opposite rotational directions (clockwise and counterclockwise) of the turntable 3. Hence, when the first and second stopper devices 10 and 20 are released and the turntable 3 is rotated clockwise or counterclockwise (in the direction indicated by an outline arrow R in FIG. 23), the leg body 31 is automatically tilted (moved to the retracting position) to the rear side with respect to the rotational direction of the turntable 3 (in the direction indicated by an outline arrow K in FIG. 23) by the frictional resistance applied by the installation surface L. As the leg body 31 is tilted about the axis in the rotational direction of the turntable 3, the lower end portion of the leg body 31 moves in the direction of separating from the installation surface L (upward in FIG. 23), and therefore, any interaction with the installation surface L can be avoided or relieved. As a result, the turntable 3 can be rotated smoothly without receiving substantial resistance from the installation surface L.

When the rotation of the turntable 3 is stopped, the leg body 31 of the support leg 30 automatically returns to the supporting position and can contact perpendicularly with the installation surface L since the rotary support 32 is biased in opposite rotational directions by the two compression springs 34 and 35. When the leg body 31 has returned to the supporting position, the leg body 31 can be held at the supporting position by the position holding device 36.

With the support leg device according to the fourth embodiment, the leg body 31 of the support leg 30 can automatically move to the retracting position as the turntable 3 rotates, while the leg body 31 can automatically return to the supporting position when the rotation of the turntable 3 is stopped as described above. Hence, the operator can perform smooth rotation of the turntable 3, without carrying out any special operations, such as screw tightening operation.

The above embodiments can be modified in various ways. For example, although the above embodiments are configured such that the position of the leg body with respect to the leg support can be finely adjusted by screwing the threaded shaft portion (support shaft portion) of the leg body into the threaded hole of the leg support, this adjustment structure may be omitted. In other words, in the above embodiments, the leg body may be integrated with the leg support.

Furthermore, in particular, by attaching a wheel or a roller to the leg body 31 of the fourth embodiment, it is possible to configure the support leg as a support leg on a caster.

Moreover, in the first to third embodiments, the movement distance between the supporting position and the retracting position of the leg body can be suitably determined.

What is claimed is:

1. A cutting tool having;
a base configured to rest upon an installation surface,
a turntable on which a workpiece can be placed, the turntable being rotatable relative to the base,
a cutter mounted on the turntable for cutting the workpiece,
a stopper device operable to lock and unlock a rotational position of the turntable relative to the base,
a support leg on the turntable, the support leg being configured to support the turntable against the installation surface, wherein the support leg is movable, in response to the operation of the stopper device, between an upper retracting position, in which the support leg is not in contact with the installation face and the stopper device is in the unlocked position, and a lower supporting position, in which the support leg is in contact with the installation surface in an upright position and the stopper device is in the locked position.

2. The cutting tool as in claim 1, wherein:
the support leg has a support member that is vertically movable relative to the turntable, and
the operation of the stopper device is transmitted to the support member via an actuation member disposed between the support member and the stopper device.

3. The cutting tool as in claim 2, wherein
the actuation member is vertically pivotable about an axis, and
the actuation member has a first end coupled to the stopper device and a second end coupled to the support member.

4. The cutting tool as in claim 1, wherein:
the support leg has a support member vertically movable relative to the turntable and rotatable about an axis,
the support member has an engaging member,
the turntable has a cam slot engageable with the engaging member,
the stopper device has a connecting member engageable with the support member in the rotational direction of the support member, and
the engaging member can move along the cam slot to vertically move the support member as the support member rotates by the operation of the stopper device via the connecting member.

* * * * *